United States Patent
Ling et al.

(10) Patent No.: US 7,339,334 B2
(45) Date of Patent: Mar. 4, 2008

(54) REAL-TIME RESPONSIVE MOTOR CONTROL SYSTEM

(75) Inventors: Chuan-Po Ling, Hsin-Chu (TW);
Jung-Lin Chang, Hsin-Chu (TW);
Shih-Yu Lin, Hsin-Chu (TW)

(73) Assignee: Padauk Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 11/406,300

(22) Filed: Apr. 19, 2006

(65) Prior Publication Data
US 2007/0248337 A1 Oct. 25, 2007

(51) Int. Cl.
*H02P 6/08* (2006.01)
(52) U.S. Cl. .................. 318/254; 318/722; 388/907.5
(58) Field of Classification Search ............... 318/138, 318/254, 434, 439, 720–724; 388/903, 907.2, 388/907.5
See application file for complete search history.

(56) References Cited

U.S. PATENT DOCUMENTS

| | | | | |
|---|---|---|---|---|
| 4,490,661 A * | 12/1984 | Brown et al. | ............... | 318/661 |
| 5,150,030 A * | 9/1992 | Ito et al. | .................... | 318/811 |
| 5,223,775 A * | 6/1993 | Mongeau | .................... | 318/432 |
| 5,233,847 A * | 8/1993 | Tanaka | ...................... | 68/12.04 |
| 5,319,291 A * | 6/1994 | Ramirez | .................... | 318/254 |
| 6,002,234 A * | 12/1999 | Ohm et al. | ................ | 318/729 |
| 6,384,567 B1 * | 5/2002 | Maeda | ........................ | 318/801 |
| 6,528,967 B2 * | 3/2003 | Hallidy | ....................... | 318/808 |
| 6,528,968 B2 * | 3/2003 | Seima et al. | ................ | 318/811 |
| 6,647,325 B2 * | 11/2003 | Shimazaki et al. | .......... | 701/22 |
| 6,710,564 B2 * | 3/2004 | Shibuya et al. | ............ | 318/439 |

* cited by examiner

*Primary Examiner*—Bentsu Ro
(74) *Attorney, Agent, or Firm*—Rosenberg, Klein & Lee

(57) ABSTRACT

The present invention discloses a real-time responsive motor control system comprising a central MCU (Microcontroller Unit) core logic and at least one PWM (Pulse Width Modulation) MCU core logic. The central MCU core logic takes care of all interrupt events. The PWM (Pulse Width Modulation) MCU core logic is dedicated to the transformation of PWM signals so that the PWM signals output to a motor device are highly accurate. Further, the central MCU core logic may directly control the PWM MCU core logics so that the switching timing of the PWM signals is even more accurate. The present invention provides a modularized hardware architecture with flexible software control. The system design is simple and the associated cost is reduced.

16 Claims, 6 Drawing Sheets

REAL-TIME RESPONSIVE MOTOR CONTROL SYSTEM

BACKGROUND OF THE INVENTION

1. Field of the Invention

The present invention relates to a motor control system, particularly to a real-time responsive motor control system.

2. Description of the Related Art

Electromechanical control technology plays an important role in daily living; it facilitates rotary and linear motions required for applications ranging from less-sophisticated household appliances to sophisticated electronic systems and computers. With the increase in the scale and the complexity of electromechanical systems, more sophisticated electromechanical control technology is desired to meet the performance, safety and power efficiency requirements. Small-size electromechanical systems are usually employed in applications, which require highly precise electromechanical control. Large-size electromechanical systems, such as a robot, are usually employed in applications, which require very complex electromechanical control in which real-time responsiveness is very critical.

An example of the conventional electromechanical control systems may be understood with reference to FIG. 1, which is a block diagram schematically, showing a conventional control system of a brushless DC motor. The conventional motor control system comprises: a brushless DC motor 10, a Hall sensor 11, an error-detection circuit 12, and a central microcontroller device 13. The central microcontroller device 13 further comprises: a phase-processing unit 131, an error-processing circuit 134, a PWM (Pulse Width Modulation) generator 133, and a central microcontroller 132. In the brushless DC motor 10, a motor switch module 101 controls the turn-on and turn-off of a motor coil module 102. When the motor switch module 101 turns on the motor coil module 102, the Hall sensor 11, which is disposed near the motor coil module 102, detects the phase variation of the motor coil module 102 and generates phase signals corresponding to the phase variation. The signals corresponding to the phase variation are sent to phase-processing unit 131 to be processed thereby, and the resultant output signals are sent to the central microcontroller 132. The error-detection circuit 12, which is coupled to the brushless DC motor 10, detects error signals of the brushless DC motor 10 and sends the error signals to the error-processing circuit 134. The error-processing circuit 134 processes the error signals and sends the processed error signals to the central microcontroller 132. Based on the received phase signals, the received error signals, the timing signals from a timer 135 and the data from a sinusoidal lookup table 136, the central microcontroller 132 performs calculation, comparison, and analysis to work out the amended voltage and current signals needed by the motor coil module 102. The signals worked out by the central microcontroller 132 are sent to the PWM generator 133. The PWM generator 133 transforms the input PWM signals into corresponding PWM waveforms and sends the PWM waveforms to the motor switch module 101. Then, the motor switch module 101 utilizes the PWM waveforms to control the motions of the motor coil module 102.

In the abovementioned control system of a brushless DC motor, all the signals, instructions, and interruptions are processed by only a single microcontroller, which may be easily overloaded. As the microcontroller is burdened with a lot of signals, instructions, and interruptions simultaneously, the microcontroller may be unable to timely process phase detection and speed calculation to output accurate motor control signals. Further, to meet different motor control theory requirements, the hardware configuration of such a control system usually needs to be greatly modified for different applications. In this situation, not only the hardware design becomes complicated but the cost is also considerably high. Meanwhile, the adaptability of the motor control systems is pretty limited because each type of motor needs its special control system.

Accordingly, the present invention proposes a real-time responsive motor control system to solve the abovementioned problems, wherein the motor control parameters, such as phase and rotation speed, can be more precisely controlled; a modularized hardware design simplifies the architecture of the motor control system; and the adaptability of the motor control system is greatly enhanced due to flexible software programming. In addition to the simpler hardware and more flexible software, the motor control system of the present invention can focus its core function on the theoretical calculation for motor control. Thus, the present invention reduces cost, simplifies hardware design, and provides more precise motor control to optimize the motor system.

SUMMARY OF THE INVENTION

The primary objective of the present invention is to provide a real-time responsive motor control system, wherein an MMCU (Multi-MicroController Unit) system is used to control the motor device. In the MMCU system, dedicated PWM (Pulse Width Modulation) MCU core logics are provided which function under simple software programming so that precise motor control is achieved with a simple hardware design.

Another objective of the present invention is to provide a real-time responsive motor control system, which includes an MMCU system having at least one PWM MCU core logic dedicated to the calculation of PWM signals and control signals required for motor control. The PWM MCU core logics may independently detect the motor phase signals from a phase-processing MCU core logic. In response thereto, the PWM MCU core logics may accurately perform the switching of modulated pulses, or stop a program presently executed, or begin executing a new program. The PWM MCU core logics do not accept any interrupt request; all system interrupt requests are processed by a central MCU core logic. Preferably, the central MCU core logic can directly control any of the PWM MCU core logics to promptly stop the program presently being executed, or to directly interpose a program to be executed by the PWM MCU core logic, so that the system may generate accurate motor control signals. The PWM MCU core logics are microcontrollers (also referred to as microprocessors) capable of being programmed to execute a program. e.g., a sequence of coded instructions enabling the PWM MCU core logics to perform a prescribed sequence of processing operations to process PWM signals.

According to one aspect of the present invention, the present invention proposes a real-time responsive motor control system, wherein a central MCU core logic of an MMCU (Multi-MicroController Unit) control system takes charge of all interrupt events and all signal calculations, and at least one PWM MCU core logic is dedicated to work out the PWM signals required for motor operation. Each PWM MCU core logic can perform data calculation independently and provide PWM signals for the corresponding switch set in a motor switch module of a motor device. The central MCU core logic can control the execution or termination of a program in each PWM MCU core logic. The PWM MCU core logics may actively detect the control signals from a phase-processing MCU core logic to determine whether to output PWM signals and the magnitudes thereof. Thereby, the accuracy of the PWM signals output by each PWM MCU core logic can be increased.

According to another aspect of the present invention, in a motor control system having a motor device and an MMCU system with dedicated PWM MCU core logics, a phase-detection unit obtains phase signals corresponding to the phase variation of a motor coil module of the motor device, and the phase signals are sent to a phase-processing MCU core logic to be processed thereby. Then, the phase-processing MCU core logic sends the processed results to a central MCU core logic. An error-processing MCU core logic receives error signals from an error-detection circuit. Besides the phase signals from the phase-processing MCU core logic, the central MCU core logic receives the error signals from the error-processing MCU core logic and timing signals from a timer. Next, the central MCU core logic analyzes those signals with reference to a sinusoidal lookup table to accurately work out the current signals required for the motor device. The current signals are transmitted to PWM MCU core logics and transformed by the PWM MCU core logics into PWM signals. Then, the PWM signals are output to a motor switch module of the motor device to determine the on/off timings of each switch set. According to a simplified hardware architecture of the motor control system of the present invention, the abovementioned timer, sinusoidal lookup table, and error-processing MCU core logic may be integrated into the central MCU core logic.

Thus, the present invention assures the accuracy of PWM signals via dedicated PWM MCU core logics. The modularized hardware design and flexible software programming reduce the cost of the motor system according to this invention, and make it easily applicable to a wide range of applications.

To enable the objectives, technical contents, characteristics, and accomplishments to be more easily understood, the embodiments of the present invention are to be described in details in cooperation with the attached drawings below.

DETAILED DESCRIPTION OF THE INVENTION

Motors are one of the most important electromechanical devices in industry automation. In order to achieve the optimal performance, the speed and position of a motor should be precisely and efficiently controlled with instant dynamic response. To meet the abovementioned requirements, the present invention proposes a real-time responsive motor control system, which replaces the conventional design wherein only one single MCU is used to control related PWM hardware by an MMCU (Multi-MicroController Unit) system with dedicated PWM MCU core logics, and utilizes a flexible software design to generate PWM signals for motor control. Thus, critical motor parameters can be controlled through software, which creates a new territory for future development.

Figure 1:
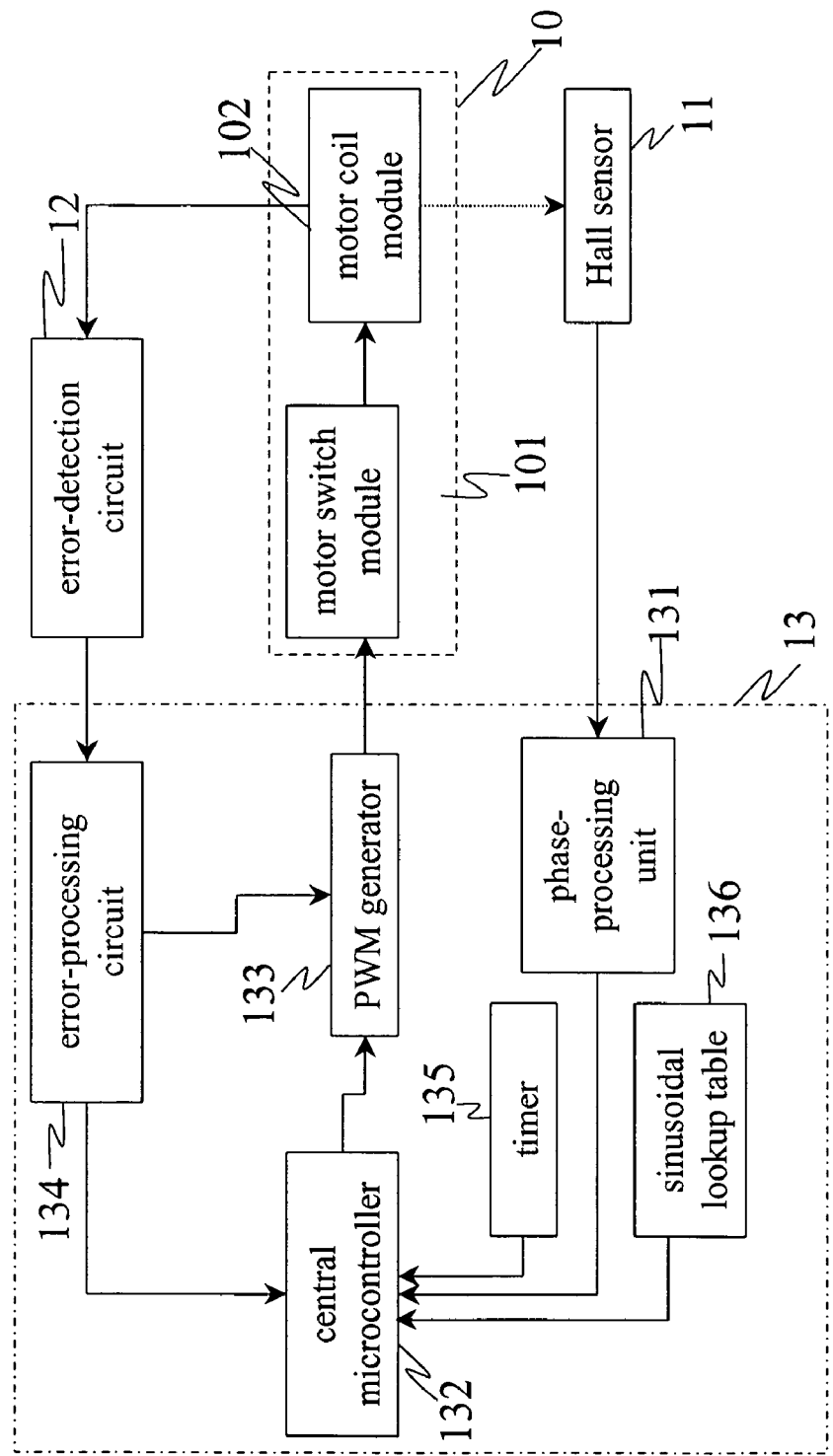
FIG. 1 is a block diagram schematically showing a conventional control system of a brushless DC motor.
Figure 2:
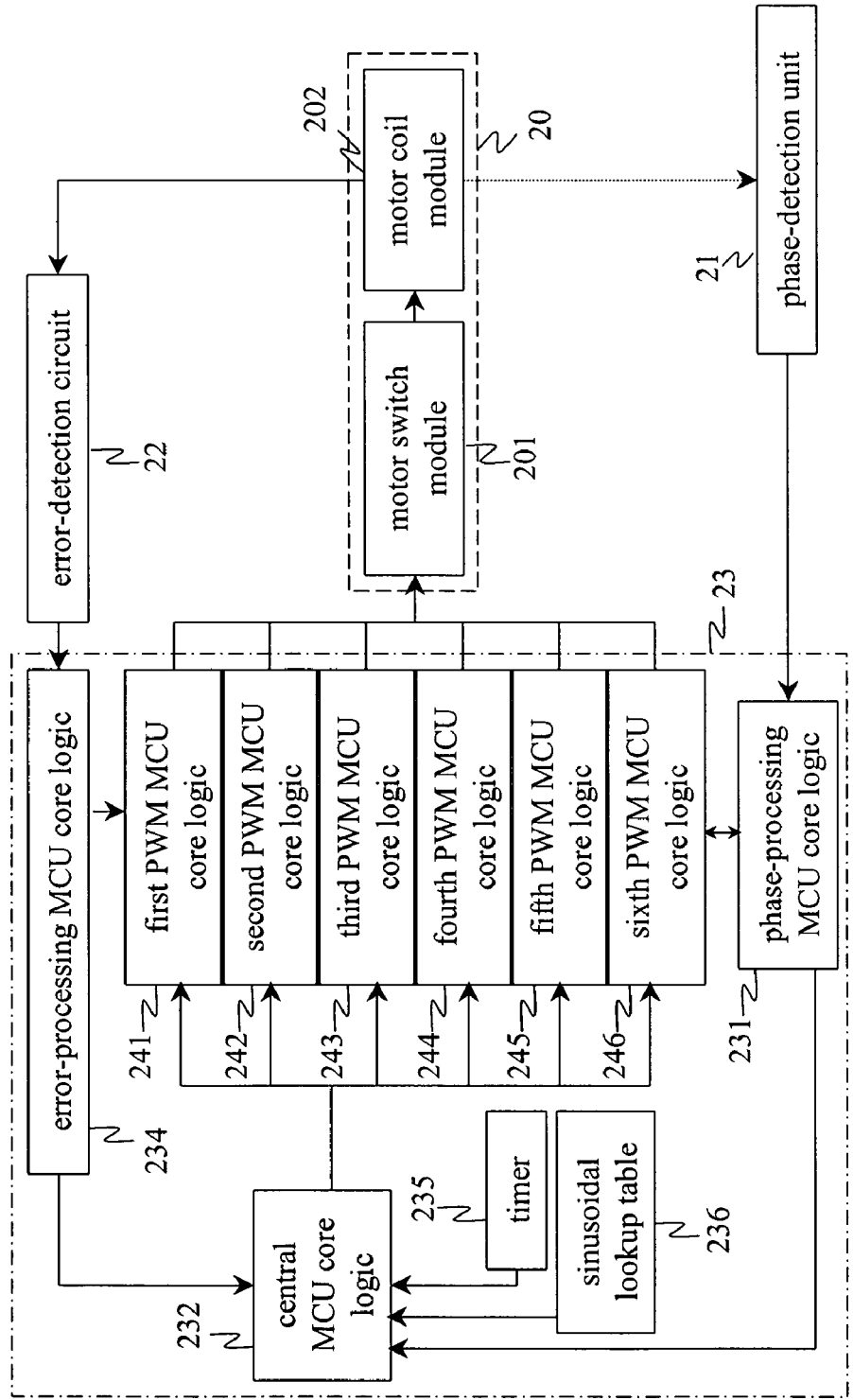
FIG. 2 is a block diagram schematically showing the motor control system according to the present invention.

Referring to FIG. 2, which is a block diagram schematically showing an embodiment of the motor control system according to the present invention, the motor control system of the present invention comprises: a motor device 20, a phase-detection unit 21, and a motor-control MCU unit 23. The motor-control MCU unite 23 is coupled to the motor device 20 and the phase-detection unit 21. The motor device 20 further comprises: a motor switch module 201 and a motor coil module 202. The motor-control MCU unit 23 further comprises: a phase-processing MCU core logic 231, an error-processing MCU core logic 234, six PWM MCU core logics 241, 242, 243, 244, 245, and 246, and a central MCU core logic 232. Each MCU core logic can execute at least one program, also referred to herein as a sequence of coded instructions. When the motor coil module 202 is operating, the phase-detection unit 21 detects the phase variation of the motor coil module 202 and generates phase signals. The phase-processing MCU core logic 231 receives and processes the phase signals. The calculation results of the phase-processing MCU core logic 231 are sent to the central MCU core logic 232. Further, an error-detection circuit 22 detects the errors of the motor device 20 and sends the error signals to the error-processing MCU core logic 234. The error-processing MCU core logic 234 processes the error signals and sends the calculation results to the central MCU core logic 232. Besides the phase data from the phase-processing MCU core logic 231 an the error data from the error-processing MCU core logic 234, the central MCU core logic 232 also receives timing signals from a timer 235. Based on the received data, and referring to a sinusoidal lookup table 236, the central MCU core logic 232 performs calculation to work out the current signals required for the operation of the motor coil module 202. Then, the central MCU ore logic 232 transmits the current signals to the corresponding PWM MCU core logics 241, 242, 243, 244, 245, and 246. The PWM MCU core logics process the received current signals and transform them into corresponding PWM signals. The PWM signals are sent to the motor switch module 201 to control the actions of the motor coil module 202.

In the abovementioned motor-control MCU unit 23, all interrupt events are processed exclusively by the central MCU core logic 232 lest the interrupt events interfere with the execution of PWM programs and the calculation/transformation of PWM signals, which are performed by PWM MCU core logics 241, 242, 243, 244, 245, and 246.

It may be readily understood by one skilled in this art that, the abovementioned error-processing MCU core logic 234, timer 235, and sinusoidal lookup table 236 may be integrated into the central MCU core logic 232 (integrated arrangement not shown in the diagrams) so that the motor control system of the present invention can be simplified.

Figure 3A:
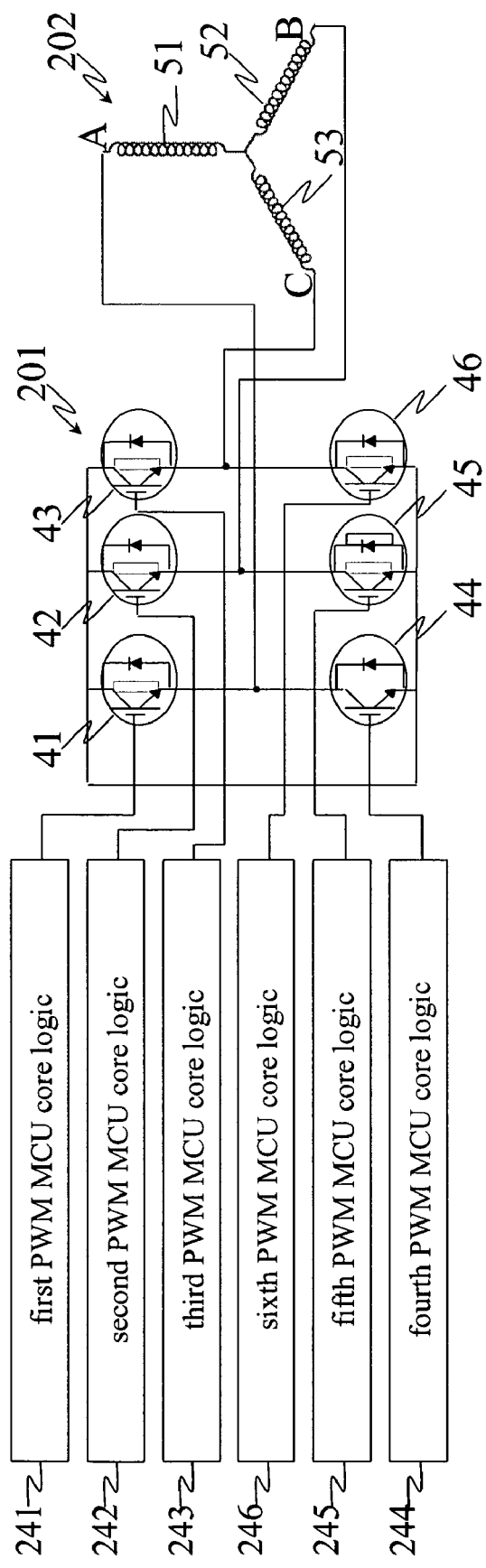
FIG. 3(a) is a diagram schematically showing the control circuit for the motor control system having one-to-one correspondence between the PWM MCU core logics and the switch transistors according to the present invention.
Figure 3B:
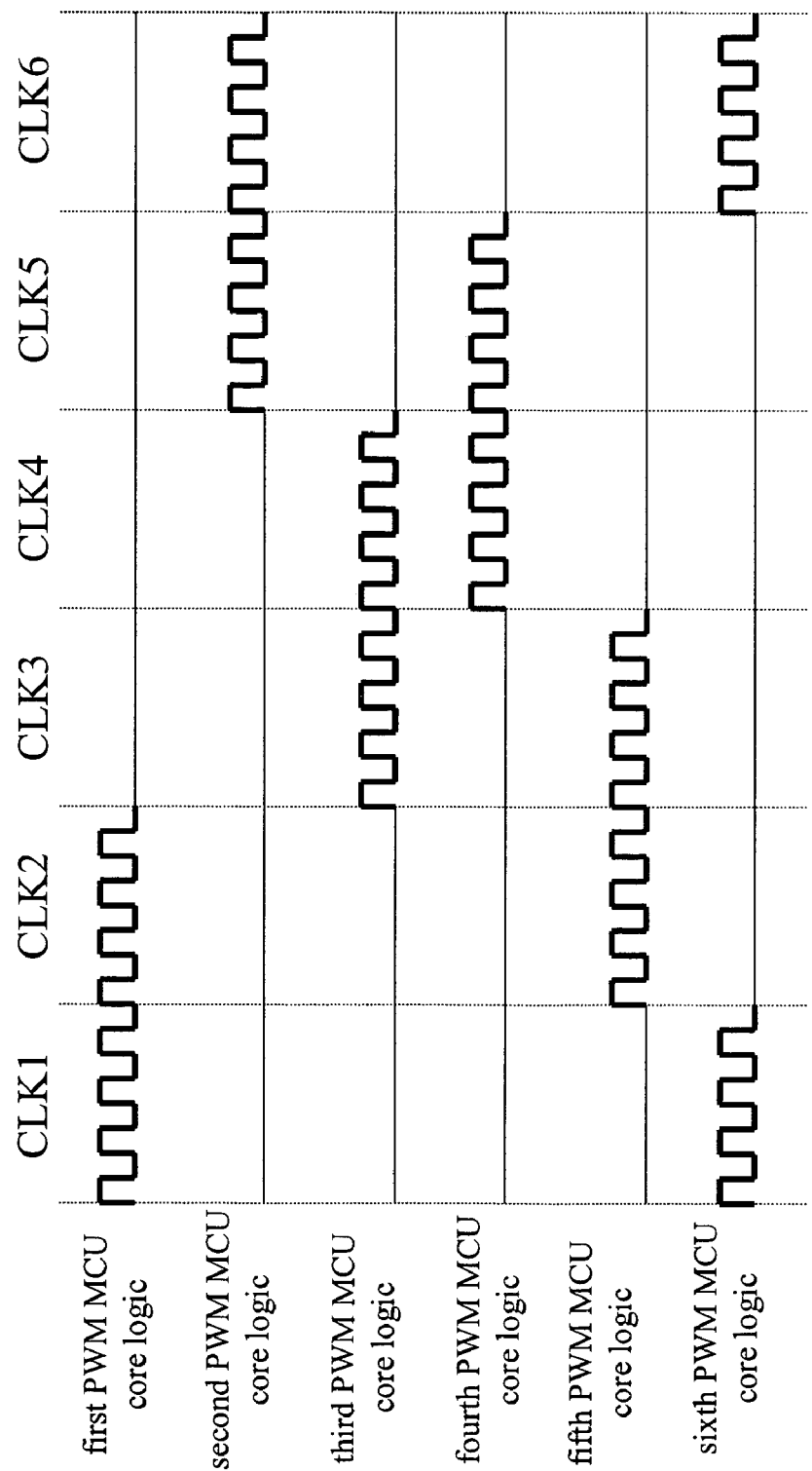
FIG. 3(b) is a time chart schematically showing the control timing for the motor control system having one-to-one correspondence between the PWM MCU core logics and the switch transistors according to the present invention.

A motor switch module comprises several (typically six) motor switch transistors. According to this invention, there are more than one possible arrangement for the correspondence between the PWM MCU core logics and switch transistors in the motor switch module. FIG. 3(a) is a diagram schematically showing the control circuit for the motor control system having one-to-one correspondence between the PWM MCU core logics and the switch transistors. FIG. 3(b) is a time chart schematically showing the control timing for the motor control system having one-to-one correspondence between the PWM MCU core logics and the switch transistors. Referring to FIG. 3(a) and FIG. 3(b), the motor switch module 201 comprises six switch transistors 41, 42, 43, 44, 45, and 46, and the motor coil module 202 comprises a first coil 51, a second coil 52 and a third coil 53. As shown in FIG. 3(a), according to an embodiment of the present invention, the PWM MCU core logics 241, 242, 243, 244, 245, and 246 respectively control the corresponding switch transistors 41, 42, 43, 44, 45, and 46 of the motor switch module 201, so that current flows to or from the Point A of the first coil 51, Point B of the second coil 52, and Point C of the third coil 53 at desired timings to generate desired motor motions. More specifically, the first PWM MCU core logic 241 controls the first switch transistor 41, which further controls the current to flow into the first coil 51 from Point A; the second PWM MCU core logic 242 controls the second switch transistor 42, which further controls the current to flow into the second coil 52 from Point B; the third PWM MCU core logic 243 controls the third switch transistor 43, which further controls the current to flow into the third coil 53 from Point C; the fourth PWM MCU core logic 244 controls the fourth switch transistor 44, which further controls the current to leave the first coil 51 from Point A; the fifth PWM MCU core logic 245 controls the fifth switch transistor 45, which further controls the current to leave the second coil 52 from Point B; the sixth PWM MCU core logic 246 controls the sixth switch transistor 46, which further controls the current to leave the third coil 53 from Point C. Thus, the first and the fourth switch transistors 41 and 44 control the current direction of the first coil 51; the second and the fifth switch transistors 42 and 45 control the current direction of the second coil 52; and the third and the sixth switch transistors 43 and 46 control the current direction of the third coil 53.

Refer to FIG. 3(b), which is a time chart explaining the relationship between the PWM signals and the actions of the motor coil module 202 in the motor control system having one-to-one correspondence between the PWM MCU core logics 241, 242, 243, 244, 245, and 246 and the switch transistors 41, 42, 43, 44, 45, and 46. In timing CLK1, the first and sixth PWM MCU core logics 241 and 246 respectively turn on their corresponding first and sixth switch transistors 41 and 46 simultaneously, and thus, the current flows into the motor coil module 202 at Point A of the first coil 51 and leaves the motor coil module 202 from Point C of the third coil 53. In timing CLK2, the first and fifth PWM MCU core logics 241 and 245 respectively turn on their corresponding first and fifth switch transistors 41 and 45 simultaneously, and thus, the current flows into the motor coil module 202 at Point A of the first coil 51 and leaves the motor coil module 202 from Point B of the second coil 52. In timing CLK3, the third and fifth PWM MCU core logics 243 and 245 respectively turn on their corresponding third and fifth switch transistors 43 and 45 simultaneously, and thus, the current flows into the motor coil module 202 at Point C of the third coil 53 and leaves the motor coil module 202 from Point B of the second coil 52. In timing CLK4, the third and fourth PWM MCU core logics 243 and 244 respectively turn on their corresponding third and fourth switch transistors 43 and 44 simultaneously, and thus, the current flows into the motor coil module 202 at Point C of the third coil 53 and leaves the motor coil module 202 from Point A of the first coil 51. In timing CLK5, the second and fourth PWM MCU core logics 242 and 244 respectively turn on their corresponding second and fourth switch transistors 42 and 44 simultaneously, and thus, the current flows into the motor coil module 202 at Point B of the second coil 52 and leaves the motor coil module 202 from Point A of the first coil 51. In timing CLK6, the second and sixth PWM MCU core logics 242 and 246 respectively turn on their corresponding second and sixth switch transistors 42 and 46 simultaneously, and thus, the current flows into the motor coil module 202 at Point B of the second coil 52 and leaves the motor coil module 202 from Point C of the third coil 51. The motor coil module 202 thus operates continuously according to the abovementioned steps.

Figure 4A:
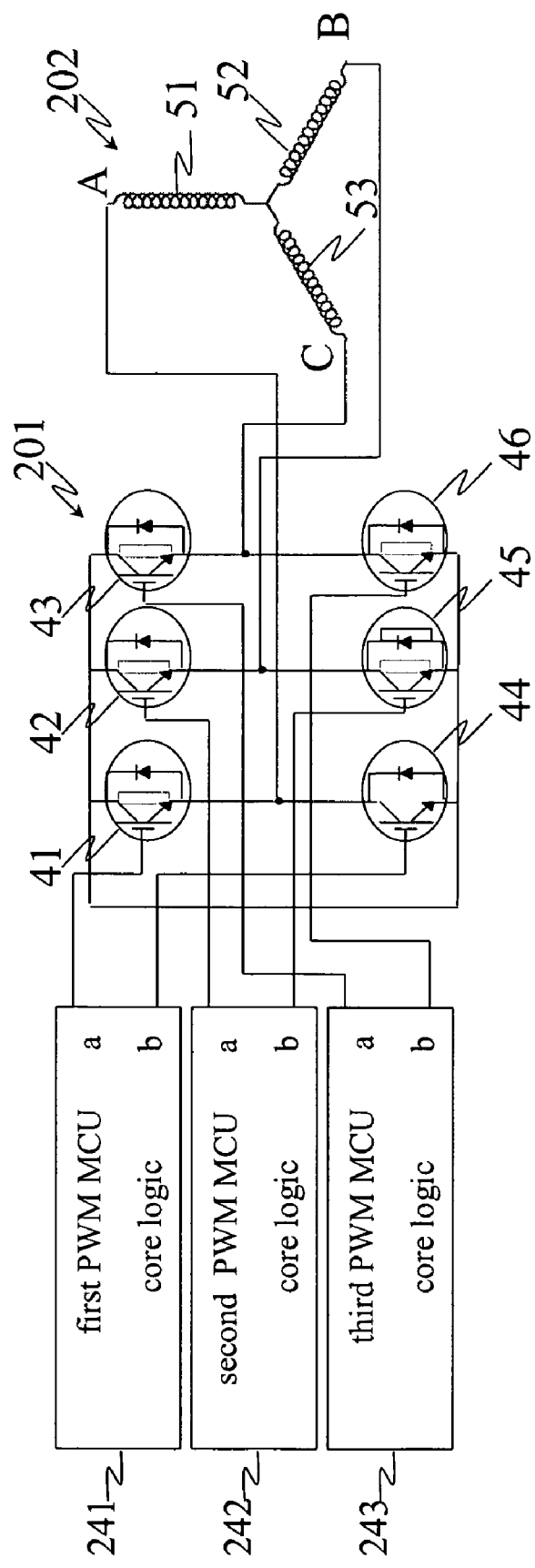
FIG. 4(a) is a diagram schematically showing the control circuit for the motor control system having one-to-two correspondence between the PWM MCU core logics and the switch transistors according to the present invention.
Figure 4B:
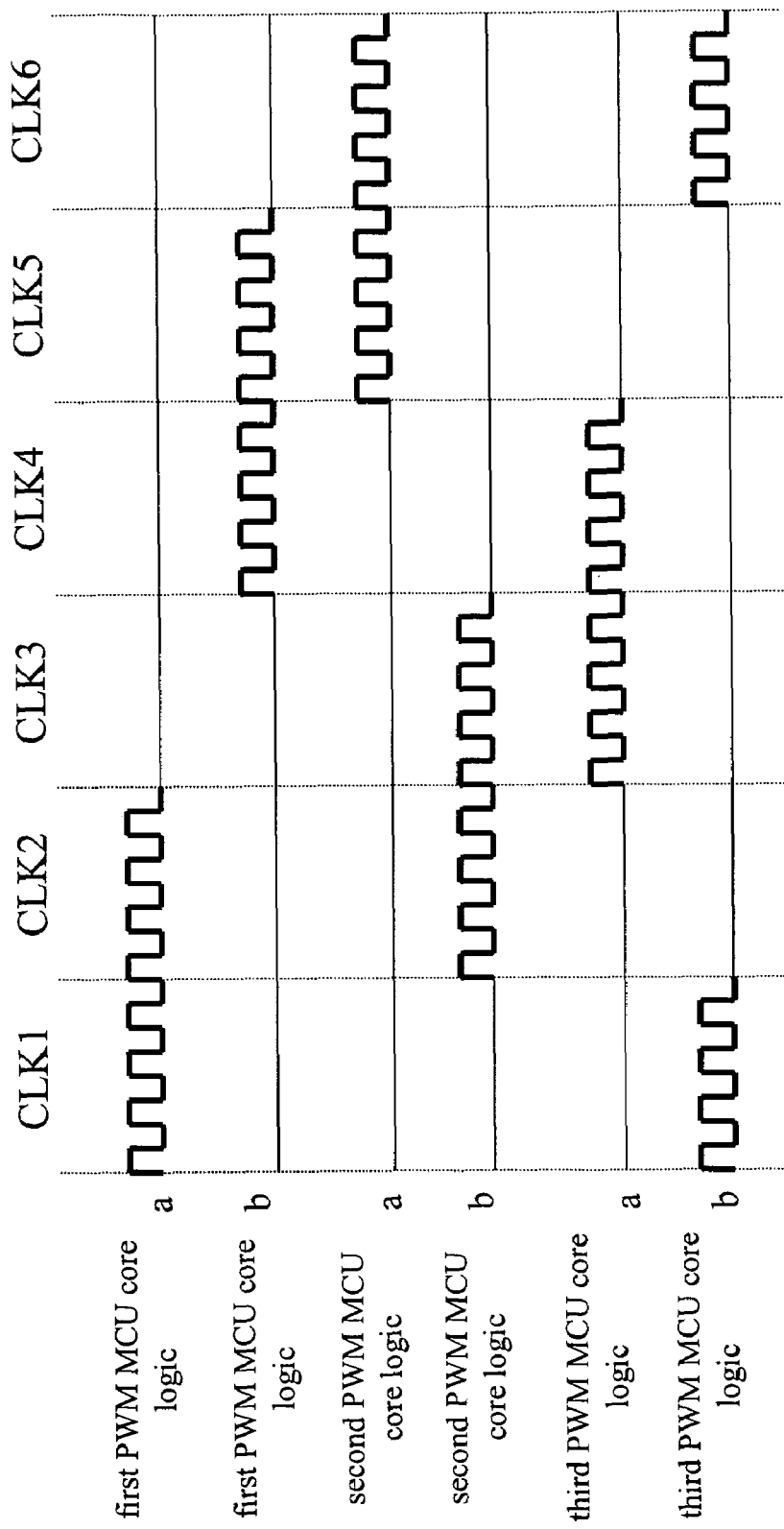
FIG. 4(b) is a time chart schematically showing the control timing for the motor control system having one-to-two correspondence between the PWM MCU core logics and the switch transistors according to the present invention.

Referring to FIG. 4(a) and FIG. 4(b), FIG. 4(a) is a diagram schematically showing the control circuit for the motor control system having one-to-two correspondence between the PWM MCU core logics and the switch transistors. And FIG. 4(b) is a time chart schematically showing the control timing for the motor control system having one-to-two correspondence between the PWM MCU core logics and the switch transistors. The architecture shown in FIG. 4(a) is similar to that shown in FIG. 3(a). However, the first PWM MCU core logic 241 controls both the first and fourth switch transistors 41 and 44, which control the current direction of the first coil 51; the second PWM MCU core logic 242 controls both the second and fifth switch transistors 42 and 45, which control the current direction of the second coil 52; and the third PWM MCU core logic 243 controls both the third and sixth switch transistors 43 and 46, which control the current direction of the third coil 53.

Refer to FIG. 4(b), which is a time chart explaining the relationship between the PWM signals and the actions of the motor coil module 202 in the motor control system having one-to-two correspondence between the PWM MCU core logics 241, 242 and 243 and the switch transistors 41, 42, 43, 44, 45 and 46. In timing CLK1, the first and third PWM MCU core logics 241 and 243 respectively turn on their corresponding first and sixth switch transistors 41 and 46 simultaneously, and thus, the current flows into the motor coil module 202 at Point A of the first coil 51 and leaves the motor coil module 202 from Point C of the third coil 53. In timing CLK2, the first and second PWM MCU core logics 241 and 242 respectively turn on their corresponding first and fifth switch transistors 41 and 45 simultaneously, and thus, the current flows into the motor coil module 202 at Point A of the first coil 51 and leaves the motor coil module 202 from Point B of the second coil 52. In timing CLK3, the third and second PWM MCU core logics 243 and 242 respectively turn on their corresponding third and fifth switch transistors 43 and 45 simultaneously, and thus, the current flows into the motor coil module 202 at Point C of the third coil 53 and leaves the motor coil module 202 from Point B of the second coil 52. In timing CLK4, the third and first PWM MCU core logics 243 and 241 respectively turn on their corresponding third and fourth switch transistors 43 and 44 simultaneously, and thus, the current flows into the motor coil module 202 at Point C of the third coil 53 and leaves the motor coil module 202 from Point A of the first coil 51. In timing CLK5, the second and first PWM MCU core logics 242 and 241 respectively turn on their corresponding second and fourth switch transistors 42 and 44 simultaneously, and thus, the current flows into the motor coil module 202 at Point B of the second coil 52 and leaves the motor coil module 202 from Point A of the first coil 51. In timing CLK6, the second and third PWM MCU core logics 242 and 243 respectively turn on their corresponding second and sixth switch transistors 42 and 46 simultaneously, and thus, the current flows into the motor coil module 202 at Point B of the second coil 52 and leaves the motor coil module 202 from Point C of the third coil 51. The motor coil module 202 thus operates continuously according to the abovementioned steps.

In addition to the above arrangements, it is also possible for the relationship between the PWM MCU core logics and the switch transistors of the motor switch module to be one-to-three correspondence or otherwise. The control operation thereof is similar to what is described above and will not be repeated here.

Moreover, for even better accuracy of the output PWM signals, it is preferable that any of the abovementioned PWM MCU core logics may be directly controlled by another MCU core logic, for example by the central MCU core logic, to promptly stop the program being executed by the PWM MCU core logic, or to directly interpose a program into the PWM MCU core logic and enable the PWM MCU core logic to execute it.

The system may be arranged so that any of the abovementioned PWM MCU core logics may directly detect phase signals from the phase-processing MCU core logic, and in response to the detected phase signals, stops its present program or starts executing a new program.

In the motor control system of the present invention, complicated hardware is not required; while simple software control and modularized motor control hardware are used which simplify system design and reduce associated cost. Further, dedicated PWM MCU core logics are provided to process PWM signals, which enhance the accuracy of the motor control system of the present invention.

Although the present invention has been described with reference to the preferred embodiments thereof, it will be understood that the invention is not limited to the details thereof. Various substitutions and modifications will occur to those of ordinary skill in the art. Therefore, all such substitutions and modifications are intended to be embraced within the scope of the invention as defined in the appended claims.

What is claimed is:

1. A pulse-width-modulation microcontroller system, comprising:
   at least one central MCU (Micro-Controller Unit) core logic, for processing a plurality of pulse-operation signals;
   a plurality of independently programmed PWM (Pulse-Width-Modulation) MCU core logics, each PWM MCU core logic receiving said pulse-operation signals and executing a sequence of coded instructions to process said pulse-operation signals to generate a plurality of corresponding PWM signals, said sequence of coded instructions in said each PWM MCU core logic being determined by said at least one central MCU core logic; and
   a motor switch module having a plurality of switch sets, said motor switch module receiving said PWM signals and determining the switching mode of said switch sets according to said PWM signals.

2. The pulse-width-modulation microcontroller system according to claim 1, wherein said each PWM MCU core logic denies interrupt requests when said sequence of coded instructions corresponds to generation of said PWM signals.

3. The pulse-width-modulation microcontroller system according to claim 1, wherein said at least one central MCU core logic stops the execution of said sequence of coded instructions or programs said each PMW MCU to execute another sequence of coded instructions in said each PWM MCU core logic.

4. The pulse-width-modulation microcontroller system according to claim 1, further comprising a phase-processing MCU core logic, containing phase data of a motor, wherein said each PWM MCU core logic detects said phase data from said phase-processing MCU core logic and deactivates the execution of said sequence of coded instructions or executes a new sequence of coded instructions in response thereto.

5. The pulse-width-modulation microcontroller system according to claim 1, wherein said each PWM MCU core logic corresponds to a respective one of said switch sets.

6. The pulse-width-modulation microcontroller system according to claim 1, wherein each of said PWM MCU core logics corresponds to more than one of said switch sets.

7. A real-time responsive motor control system, electrically connected to a motor device and a phase-detection unit, said phase-detection unit obtaining phase data and generating corresponding phase signals when said motor device is operating, said motor control system comprising:
   a phase-processing MCU (Micro-Controller Unit) core logic, coupled to said phase-detection unit, for receiving said phase signals and calculating the phase variation of said motor device;
   a plurality of independently programmed PWM (Pulse-Width-Modulation) MCU core logics, each PWM MCU core logic for execution of a sequence of coded instructions, said each PWM MCU core logic providing PWM signals for controlling the operation of said motor device; and
   a central MCU core logic, receiving signals from said motor device and said phase signals from said phase-processing MCU core logics, performing calculation based on said received signals, and outputting the calculation results to said each PWM MCU core logic to modify the operation of said motor device.

8. The real-time responsive motor control system according to claim 7, wherein said motor device comprises a motor coil module and a motor switch module, said motor switch module having a plurality of switch sets coupled to said motor coil module for controlling said motor coil module, and wherein said each PWM MCU core logic corresponds to one of said switch sets.

9. The real-time responsive motor control system according to claim 7, wherein said motor device comprises a motor coil module and a motor switch module, said motor switch module having a plurality of switch sets coupled to said motor coil module for controlling said motor coil module, and wherein said each PWM MCU core logic corresponds to more than one of said switch sets.

10. The real-time responsive motor control system according to claim 7, wherein said each PWM MCU core logic denies interrupt requests while providing said PWM signals to said motor device.

11. The real-time responsive motor control system according to claim 7, wherein said each PWM MCU core logic provides PWM signals to said motor device in accordance with said sequence of coded instructions executed by said each PWM MCU core logic, and wherein said central MCU core logic stops said each PWM MCU core logic from executing said sequence of coded instructions, or programs said each PWM MCU to execute another sequence of coded instructions.

12. The real-time responsive motor control system according to claim 7, wherein said each PWM MCU core logic provides PWM signals to said motor device in accordance with said sequence of coded instructions executed by said each PWM MCU core logic, and wherein said each PWM MCU core logic detects said phase signals from said phase-processing MCU core logic, and deactivates said sequence of coded instructions presently executed or initiates execution of another sequence of coded instructions in response thereto.

13. The real-time responsive motor control system according to claim 7, wherein said motor control system is connected to said motor device via an error-detection circuit.

14. The real-time responsive motor control system according to claim 13, wherein said central MCU core logic is connected to said error-detection circuit via an error-processing MCU core logic to receive error signals from said error-detection circuit.

15. The real-time responsive motor control system according to claim 7, wherein said phase-processing MCU core logic, said each PWM MCU core logic, and said central MCU core logic are integrated into a single chip.

16. The real-time responsive motor control system according to claim 7, wherein said motor device is a brushless DC servomotor.

* * * * *